Patented Dec. 19, 1939

2,183,626

UNITED STATES PATENT OFFICE 2,183,626

COMPOUNDS OF THE DIBENZANTHRONE SERIES

Otto Stallmann, Bridgeton, N. J., assignor to E. I. du Pont de Nemours & Company, Wilmington, Del., a corporation of Delaware No Drawing. Application May 25, 1938,
Serial No. 209,991

5 Claims. (Cl. 260—355)

This invention relates to the preparation of new compounds of the dibenzanthrone series, more particularly to the preparation of new and valuable betahydroxyalkyl ethers of leuco dibenzanthrone compounds, and the further esterification and etherification products of such hydroxyalkyl ethers.

While it is known that leuco esters of vat dyestuffs may be prepared which are water soluble and which may be reconverted to the original vat dyestuff by acids or acid oxidizing agents, these compounds are inapplicable for many uses, such as for the coloring of oils, fats, waxes, etc., and because of their instability they cannot be further reacted upon to render them soluble in many solvents and organic substances for which colors are now used.

It is an object of this invention to prepare new alkylol ethers of leuco dibenzanthrone compounds which in themselves are suitable for coloring organic solvents, plastics, etc., and which because of the presence of a reactive hydroxy group in the aliphatic ether side chain are valuable for the preparation of color compounds for use in waxes, oils, fats, resins, etc.

It is a further object of the invention to prepare new and valuable derivatives of the hydroxyalkyl ethers of leuco dibenzanthrone compounds, which are also valuable as coloring materials.

I have found that new and valuable dibenzanthrone compounds can be produced by reacting upon the dibenzanthrone compounds in the common leuco or the more stable reduced forms with alkylene oxides at elevated temperatures and preferably in the presence of organic solvents.

By the expression "leuco form or the more stable reduction derivatives", I refer to the dibenzanthorne compounds in the common leuco form and to those stable reduction or leuco derivatives which are obtainable by the process more particularly described in U. S. Patent 2,148,042 and Serial No. 209,990. By the term "alkylene oxides" I refer to those alkyl and cyclic alkyl compounds which contain an oxygen bridge coupling adjacent carbon atoms in an aliphatic or cycloaliphatic chain, such as ethylene oxide, propylene oxide, isobutylene oxide, cyclohexene oxide, epichlorhydrin, etc.

These new alkylol ethers may be prepared from any of the leuco or stable reduction products of the dibenzanthrone series including those which carry additional hydroxy groups elsewhere in the molecule, such as the leucohydroxydibenzanthrones and their alkyl derivatives.

According to this invention the leuco or stable reduction derivative of the dibenzanthrone compound is reacted with an alpha, beta-alkylene oxide at temperatures of from 100 to 190° C. No additional condensing agent is necessary. Where the reaction is carried out in a solvent the reaction mass carrying the resulting alkyl ether of the dibenzanthrone compound in solution may be freed from insoluble impurities by filtration and the desired leuco ether isolated by evaporation or steam distillation of the solvent. Where the reaction is carried out in an excess of alkylene oxide as a reaction medium, this excess oxide or its polymerization products may be extracted with hot water. The leuco alkylol ether of the dibenzanthrone compound being relatively water insoluble may be dissolved in organic solvents and freed from any insoluble impurities by filtration, and recovered as above described. These new hydroxyalkyl leuco ethers are in general crystalline solids usually red in color, relatively insoluble in water, but highly soluble in organic solvents such as benzene. They are also somewhat soluble in the lower aliphatic hydrocarbons, acetone, etc. When dissolved in concentrated sulfuric acid and particularly when heated in such acid they are hydrolyzed to the stable ketonic parent material or its hydrolyzation products. These new alkylol ethers of the leucodibenzanthrone compounds when dissolved in organic solvents exhibit a red color in transmitted light and a strong reddish- to greenish-yellow fluorescence in reflected light. These products because of the presence of the side chain hydroxyl group may be further esterified with inorganic acids to give water soluble esters. They may also be esterified with aliphatic acid chlorides or anhydrides to give new oil soluble colors.

In some cases, particularly where a large excess of the lower molecular weight alkylene oxides are employed and the reaction is carried out at high temperatures, some polymerization of the alkylene oxide chain may be effected giving products which are less crystalline in form but which exhibit increased solubility in oils.

The following examples are given to illustrate the invention more fully. The parts used are by weight.

Example 1

30 parts of the stable leuco compound of Bz-2, Bz-2′-dimethoxydibenzanthrone, the product of Example 1 of the copending application Serial No. 186,750, now U. S. Patent 2,148,042, and 250 parts of ethylene oxide are heated in an iron autoclave under agitation for 8 hours at 120 to 125° C. until the pressure, which at first amounts to approximately 300 lbs. per square inch, has dropped to less than 5 lbs. at 120° C. indicating practicaly complete polymerization of the excess of ethylene oxide.

The charge is then cooled and the deep red colored highly viscous mass is extracted with hot water by dilution and repeated decantation. The residual semi-solid mass is dried at steam bath temperatures, giving the crude (beta-hydroxy ethyl) either of leuco-dimethoxydibenzanthrone, which is a bright red colored, water-insoluble stable solid, readily soluble in organic solvents, such as pyridine, benzene, toluene, nitrobenzene and naphthalene with a strong red color, but only slightly soluble in alcohol and in cold glacial acetic acid.

Example 2

The leuco-ether may be converted into a water-soluble sulfuric acid ester as follows:

17 parts of the product as obtained above, are dissolved in 150 parts of pyridine and the deep red solution is further dehydrated by distillation until the temperature reaches 115 to 117° C.

To the residue there is added at 60° C. a solution, prepared by reacting 50 parts of chlorosulfonic acid with 150 parts of dry pyridine at temperatures below 60° C. and the resulting esterification mass is then stirred for one-half hour at 65 to 70° C. and poured into 1000 parts of cold water.

The deep red colored solution, thus obtained, is clarified by filtration. To the filtrate are added 100 parts of soda ash, and the pyridine is removed by steam distillation. The residual solution is evaporated to 300 parts of a deep red colored paste, which dyes and prints cotton in red shades, which may be regenerated into the bluish-green shades of the parent dyestuff by acid oxidizing agents under somewhat more stringent conditions than generally employed for the dyeing and printing of the leuco-sulfuric acid esters of the same parent dyestuffs, which carry the sulfate radical directly on the meso carbon atoms of the benzanthrone groups.

The water-insoluble (beta-hydroxy ethyl) ether of leuco-dimethoxydibenzanthrone may be used as a dyestuff for the coloring of oils, gasoline, waxes, and many kinds of artificial resins or plastic masses, in which the leuco-ether is soluble to at least some extent with a red color in transmitted light, exhibiting a very strong yellowish fluorescence in reflected light.

Example 3

The solubility and fluorescent shade of the leuco-ethanol ether in these materials is very considerably improved, when the "side chain" hydroxy group in the compound is further esterified with aliphatic acid chlorides or anhydrides as follows:

10 parts of the above described dry reaction product of Example 1 (crude (beta-hydroxy ethyl) ether of leuco dimethoxydibenzanthrone) are dissolved in 300 parts of "Solvent Naphtha" and to the solution are added 50 parts of acetic anhydride. The mass is then heated to reflux temperatures (130 to 140° C.) and held for one-half hour, cooled to 100° C. and filtered. The filtrate is steam distilled free from solvent and the residual semi-solid mass is dried at steam bath temperatures.

The product is soluble in oil and gasoline in moderate concentrations with a reddish-orange color in transmitted light, exhibiting a very strong and bright reddish-yellow fluorescence in reflected light.

By substituting for the acetic anhydride in the above esterification 30 parts of crude lauric acid chloride (the chlorides of the crude coconut acids), the crude lauric acid ester of the (beta-hydroxyethyl) ether of leuco-dimethoxydibenzanthrone is obtained, which is a red solid, possessing a very similar stability, shade and fluorescence, but much greater solubility in oil and gasoline in comparison with the above described acetyl derivative.

Example 4

50 parts of the same dry stable leuco derivative of dimethoxydibenzanthrone, as was used in Example 1, are suspended in a solution of 60 parts of ethylene oxide in 250 parts of dry benzene. The charge is then heated in an iron autoclave under agitation for eight hours at 130 to 140° C. and then cooled to room temperature. 10 parts of soda ash are added to the mass which is then steam distilled free from solvent. The residual mass is filtered and the cake is washed alkali-free with water.

The product, thus obtained, consists of red crystals, which are very similar in properties to those of the same product, made without the use of benzene in the alkylation of the leuco with ethylene oxide.

Example 5

The leuco-ethanol ether may be converted into the water-soluble xanthate as follows:

50 parts of the above aqueous filter cake, equivalent to 10 parts of the dry stable leuco ethanolether derivative are suspended in 100 parts of a 35% sodium hydroxide solution and 50 parts of carbon disulfide are added to the mass, which is further stirred for 30 hours at room temperature. The mass is then further diluted with cold water to 400 parts by volume and the red colored precipitate is filtered off. The filter cake is milled to a smooth color paste with the addition of enough water to bring the total weight to 100 parts. The color paste, thus obtained, consists of the crude xanthate of the (beta-hydroxyethyl) ether of leuco-dimethoxydibenzanthrone, which is soluble in water and dyes and prints cotton in brownish-red shades, which may be converted to the bluish-green shade of the parent dyestuff by strong acid oxidizing agents.

Example 6

40 parts of a filter cake of the stable leuco compound of dimethoxydibenzanthrone, containing 20 parts of the dry leuco, are dehydrated by distilling with 300 parts of "Solvent Naphtha", until the distilling temperature is above 130° C. and until there remain 150 parts of the dry suspension of the leuco in the solvent. The mass is then cooled to room temperature, and 68 parts of a 15% solution of ethylene oxide in "Solvent Naphtha" are added and the mass is then heated in an autoclave for 12 hours at 150 to 154° C. The charge is then cooled to room temperature and filtered cold. The product may be isolated from the filtrate as in Example 4.

Example 7

To the deep red colored filtrate of Example 6, containing the (beta-hydroxyethyl) ether of leuco-dimethoxydibenzanthrone formed in the autoclave reaction in solution, there are added 15 parts of soda ash and 15 parts of the bromide of a crude, technical mixture of "long chain" aliphatic alcohols (which may be obtained by stirring 213 parts of a technical alcohol product comprising a mixture of the higher branched chain aliphatic alcohols containing mainly those containing from 5 to 8 carbon atoms with 720 parts of an aqueous 48% hydrobromic acid and 186 parts of a 96% sulfuric acid at reflux temperatures (110 to 120° C.) for 6½ hours, cooling to room temperature, decanting off the water layer, washing the oil layer several times with water and then with a diluted potassium carbonate solution and drying the resulting 240 parts of oily bromide with calcium chloride). The mass is heated under agitation at reflux temperatures (130 to 140° C.) for several hours and then cooled and filtered at 30° C. The filtrate is dried in vacuo at 100° C., whereby the crude long chain aliphatic ether of the (beta-hydroxyethyl) ether of leuco-dimethoxydibenzanthrone is obtained in the form of a semi-solid red mass, which possesses similar solubility and shade, when dissolved in oils, gasoline, etc., in comparison with the corresponding laurate, described in Example 3.

Example 8

40 parts of the same dry, pulverized stable leuco compound of dimethoxydibenzanthrone, as was used in the previous examples, are suspended in 400 parts of "Solvent Naphtha", containing 50 parts of propylene oxide in solution and the mass is heated for 10 hours at 150 to 155° C. in an iron autoclave under agitation at pressures from 50 to 60 lbs. per square inch. The charge is then cooled below 100° C. and further diluted with 400 parts of "Solvent Naphtha". The mass is filtered at 100 to 110° C. and the filtrate is steam distilled free from solvent. The (beta-hydroxypropyl) ether of leuco-dimethoxydibenzanthrone is precipitated during the course of the steam distillation in the form of large, well defined crystals, which are deep red colored and which may be isolated by filtration and dried at 100° C. in the air without decomposition. The compound is readily soluble in the usual organic solvents and in pyridine with a deep red color and the product is unvattable and stable towards air oxidation, when dissolved in pyridine or in solvents even at high temperatures. The (beta-hydroxypropyl) ether of leuco-dimethoxydibenzanthrone is somewhat soluble in organic solvents, oils, gasoline, and in other organic products with a strong and bright red color in transmitted light, exhibiting a very strong yellowish fluorescence in reflected light and therefore serves as a valuable dyestuff for these and other products such as cellulose derivatives which are soluble in such organic solvents. The solubility of these products in all kinds of organic solvents, oils, etc., may be increased by esterifying the hydroxyalkyl compound with fatty acid chlorides or anhydrides as more particularly described in Example 3.

Example 9

50 parts of a filter cake, containing 25 parts of the same stable leuco derivative, as was used in the previous examples are distilled free from water with 300 parts of o-dichlorobenzene at a final temperature of 175° C. The anhydrous suspension of the leuco is then further diluted with 400 parts of o-dichlorobenzene and the mass is kept at reflux (170 to 175° C.), while slowly adding over a 4 hour period, 100 parts of epichlorhydrin. After heating for another 8 hours at reflux, the mass is cooled to 100° C. and filtered at this temperature. The deep red colored filtrate is steam distilled free from the solvents and the residual solid is isolated by decantation and dried at 100° C. The product thus obtained contains 6.77% of organic bound chlorine. It is the propanol ether of leuco-dimethoxydibenzanthrone, containing a hydroxy group and a chlorine atom in the aliphatic ether chain. It is sparingly soluble in cold organic solvents with a deep red color and is unvattable under ordinary conditions.

Example 10

35 parts of the dry stable leuco derivative of Bz-2,Bz-2'-dimethoxydibenzanthrone as used in Example 1 are heated in 200 parts of "Solvent Naphtha" containing 50 parts of isobutylene oxide in an autoclave at 150 to 155° C. for 10 hours, the charge is cooled to room temperature, filtered and evaporated to dryness. The resulting isobutanol ether of dimethoxydibenzanthrone is a deep red colored solid. It is comparatively more soluble in all organic solvents and in oils, gasoline, waxes, etc., than the above described lower alkylol ethers of dimethoxydibenzanthrone. The product is therefore suitable for use as a fluorescent dyestuff for the coloring of all kinds of organic materials with a bright red color in transmitted light, exhibiting a brownish to yellowish-red fluorescence in reflected light.

Example 11

58 parts of a filter cake, containing 25 parts of the same stable leuco derivative of dimethoxydibenzanthrone, as used in Example 1, are suspended in 300 parts of "Solvent Naphtha" and the suspension is dehydrated by distillation to a final temperature of 130° C. The residual mass is then diluted with 200 parts of "Solvent Naphtha", 50 parts of cyclohexene oxide are added and the mass is heated for 12 hours in an iron autoclave at 150 to 155° C. under agitation. The charge is then cooled to 40° C. and filtered at this temperature. The filtrate is steam distilled free from solvent and the remaining solid is filtered off and dried at 100° C. The deep red colored product, thus obtained, is the di(beta-hydroxycyclohexyl) ether of leuco-dimethoxydibenzanthrone. It is in general quite similar in properties to the previously described lower alkylol ethers of the same leuco vat color.

The "side chain" disulfuric acid ester or organic acid esters of this product may be obtained in the same manner as illustrated for the open chain aliphatic hydroxy containing ethers in the above examples.

Example 12

20 parts of the dry, pulverized stable leuco derivative of the alkylation product of Bz-2,Bz-2'-dihydroxydibenzanthrone with ethylene dibromide (the product of Example 7 of copending application Serial No. 186,750 now U. S. Patent 2,148,042) are suspended in 400 parts of "Solvent Naphtha", containing 400 parts of propylene oxide in solution. The suspension is heated in an iron autoclave at 175 to 180° C. for 14 hours and then cooled and filtered at 40° C. The filtrate is steam distilled free from solvent and the residual solid is filtered off and dried at 100° C. The red colored product, thus obtained, is soluble in organic solvents and in oils, gasoline, waxes, etc., with a very bright and strong pink color in transmitted light, exhibiting a strong yellowish to greenish-yellow fluorescence in reflected light. The solubility of the product in organic materials may be further increased by converting the same into the higher fatty acid ester in the manner illustrated in Example 3 or by the method disclosed in copending application Serial No. 209,994 (Example 2).

Example 13

When the same stable leuco compound, as used in Example 12 is heated in an autoclave with equivalent amounts of ethylene oxide, dissolved in 10 parts of dry benzene per one part of ethylene oxide for 10 hours at 136 to 138° C. (at a pressure from 140 to finally 55 lbs. per square inch), the corresponding di(beta-hydroxyethyl) ether of the leuco-vat color is obtained and may be isolated in the same manner, as described in the above example. This product is a red, solvent-soluble solid. Its solubility and shade in organic materials is similar to the di(beta-hydroxypropyl) ether described in Example 12.

Example 14

50 parts of the dry monosodium salt of the stable reduction product of Bz-2,Bz-2'-dihydroxydibenzanthrone (as obtained by drying the sodium salt paste of Example 2 of U. S. application Serial No. 209,990) are charged into an iron autoclave. 200 parts of ethylene oxide are introduced into the autoclave, and the charge is heated under pressure at 125° C. for a total of 12 hours and then cooled to room temperature and diluted with 6000 parts of water.

The water insoluble semi-solid reaction product is isolated by pouring off the water layer, leaving a deep red colored residue which is dried at 100° C. The resulting dry beta-hydroxyethyl ether corresponds in stability and coloring properties to the straight alkyl ethers of this stable reduction product of Bz-2,Bz-2'-dihydroxydibenzanthrone of U. S. application Serial No. 209,990, except that it is somewhat less soluble in oil and in gasoline.

The commercial value of the product is enhanced when it is further esterified with aliphatic acid chlorides as above illustrated.

Example 15

57 parts of a filter cake, containing 20 parts of the dry stable reduction product (free hydroxy compound) from Bz-2,Bz-2'-dihydroxydibenzanthrone, as obtained in Example 4 of U. S. application Serial No. 209,990 are suspended in 300 parts of "Solvent Naphtha" and the mass is dehydrated by distilling off the water together with some solvent until finally the temperature reaches 138° C., and the residual anhydrous suspension contains 120 parts of dry solvent. This suspension is charged into an iron autoclave together with a 15% solution containing 10 parts of ethylene oxide, dissolved in dry benzene. The charge is heated under agitation for 12 hours to 150 to 155° C. and then cooled to room temperature, filtered at 25° C. and dried.

Example 16

47 parts of the free hydroxy compound of the stable reduction product of Bz-2,Bz-2'-dihydroxydibenzanthrone, as used in Example 15 and a solution from 400 parts of dry benzene and 70 parts of ethylene oxide are heated in an iron autoclave under agitation to 160–165° C. for 12 hours, at a pressure of about 135 lbs. per square inch. The charge is then cooled to room temperature and the benzene layer is poured off from the insoluble deep red, semi-solid reaction product, which is evaporated to dryness. The product is identical with the product of Examples 14 and 15.

Example 17

36 parts of the free hydroxy compound of the stable reduction product from Bz-2,Bz-2'-dihydroxydibenzanthrone (the product of Example 5 of U. S. application Serial No. 209,990), 500 parts of dry "Solvent Naphtha" and 60 parts of propylene oxide are heated in an iron autoclave under agitation to 150 to 155° C. for 10 hours.

The charge is then cooled to room temperature and filtered at 25° C. The cake is washed with 500 parts of alcohol, whereby an appreciable amount of the red colored product, which is soluble in alcohol, is removed from the cake by filtration. The filter cake is dried at 100° C. The dried material is further extracted with 800 parts of hot o-dichlorobenzene at 160° C.

The deep red colored o-dichlorobenzene solution is diluted with 1000 parts of alcohol and cooled. Well defined crystals of a very pure product are precipitated out of solution. The product is filtered off. It dyes cotton from a blue vat (red fluorescence) in bright bluish-green shades, of excellent general fastness properties. From the combined filtrates there is obtained after removal of the solvent by steam distillation a deep red colored product, which is not vattable and which is soluble in gasoline and oils with a reddish color in transmitted light and a very strong yellowish-red fluorescence in reflected light.

This latter product is the beta-hydroxypropyl ether of the stable reduction product from Bz-2,Bz-2'-dihydroxydibenzanthrone, similar in structure to the corresponding ethylene oxide reaction product, described in the previous example. The product is soluble in concentrated sulfuric acid with a deep bright blue coloration. After the treatment with concentrated sulfuric acid, the product loses its red color and its solubility in organic solvents and becomes vattable, dyeing cotton from a blue (non-fluorescent) vat in bluish-gray shades, not fast to alkali and acids.

The original (red colored) hydroxy-propylene-ether is quite stable in oil solutions, when heated to 150° C. While the product shows good solubility in oil, it becomes decidedly more soluble on esterification with (long chain) aliphatic acid chlorides, as described above. Where the etherification with propylene oxide is carried out at temperatures of from 175 to 180° C. for 14 hours, a practically quantitative yield of the (red fluorescent) unvattable oil fluorescent color is obtained, substantially free from the vattable by-product.

Example 18

100 parts of a filter cake containing 36 parts of the free hydroxy compound of the stable reduction product of Example 5 of U. S. application Serial No. 209,990 and 500 parts of "Solvent Naphtha" are distilled under agitation until (finally at 138° C. distilling temperature) an anhydrous suspension of the stable reduction product in the dry solvent is obtained. This suspension is heated in an autoclave together with 60 parts of cyclohexene oxide for 12 hours at 150 to 155° C. The charge is cooled and filtered at room temperature. The filter cake is reextracted with "Solvent Naphtha" and the deep red colored filtrates are combined and steam distilled free from solvent. The water-soluble residue is filtered off and dried at 100° C.

The product is soluble in oil with a red color exhibiting fluorescence and similar general properties to those exhibited by the corresponding open chain beta-hydroxyalkyl ethers of the stable reduction product from dihydroxydibenzanthrone described above.

*Example 19*

20 parts of the same dry, pulverized hydroxy compound, as was used in the previous example, 400 parts of "Solvent Naphtha" and 40 parts of isobutylene oxide are heated under agitation in an autoclave at 175 to 180° C. for 14 hours. The charge is then cooled to room temperature and filtered. The filtrate is steam distilled free of solvent and the red colored (beta-hydroxyisobutyl) ether, obtained as water insoluble precipitate, is filtered off and dried at 100° C.

The product is soluble in organic solvents and in oil and gasoline with a purple color in transmitted light, exhibiting a strong brown fluorescence in reflected light.

*Example 20*

A vat of dibenzanthrone is acidified with acetic acid and the resulting red free leuco derivative is filtered off, washed with alcohol, and dried in vacuum.

1 part of this red leuco dibenzanthrone is heated in 20 parts of "Solvent Naphtha" and 2 parts of propylene oxide at 175° C. in an autoclave, for 12 hours, with agitation. The resulting mass is filtered and the filtrate is steam distilled. It is then filtered and dried. The resulting beta-hydroxypropyl ether of dibenzanthrone is a dark brown crystalline product soluble in organic solvents such as nitrobenzene, benzene, etc., and in aliphatic hydrocarbon oils with a yellowish to orange color exhibiting greenish-yellow fluorescence.

I claim:

1. Compounds of the class consisting of beta-hydroxyalkyl and beta-hydroxycyclo-alkyl ethers of leuco dibenzanthrone compounds and the beta-hydroxyalkyl and beta-hydroxycyclo-alkyl ethers of the stable reduction derivatives of leuco dibenzanthrones in which the alkyl radical bearing the OH group is attached to the leuco oxygen, and their esters.

2. Compounds of the class consisting of the beta-hydroxyalkyl and beta-hydroxycyclo-alkyl ethers of leuco dibenzanthrones and the beta-hydroxyalkyl and beta-hydroxycyclo-alkyl ethers of the stable reduction products of leuco dibenzanthrone in which the alkyl radical bearing the hydroxyl group is attached to a leuco oxygen of the dibenzanthrone molecule.

3. The compounds of the class consisting of beta-hydroxyalkyl and beta-hydroxycyclo-alkyl ethers of leuco-Bz-2:Bz-2'-dialkoxydibenzanthrone in which the alkyl radical is attached to the leuco oxygen of the dibenzanthrone molecule.

4. The beta-hydroxypropyl ether of leuco Bz-2:Bz-2'-dimethoxydibenzanthrone in which the beta-hydroxypropyl radical is attached to a leuco oxygen of the dibenzanthrone molecule.

5. The process which comprises reacting a compound of the class consisting of leuco dibenzanthrones and their stable reduction derivatives with an alkylene oxide at temperatures of from about 100 to 190° C.

OTTO STALLMANN.